United States Patent
Pappalardo et al.

(10) Patent No.: US 6,977,753 B2
(45) Date of Patent: Dec. 20, 2005

(54) PRINTING ASSEMBLY AND AN OPERATOR CONTROL PANEL USER INTERFACE FOR THE PRINTING ASSEMBLY

(75) Inventors: Mark Pappalardo, Rochester, NY (US); Jerald J. Muszak, Henrietta, NY (US)

(73) Assignee: Eastman Kodak Company, Rochester, NY (US)

( * ) Notice: Subject to any disclaimer, the term of this patent is extended or adjusted under 35 U.S.C. 154(b) by 1077 days.

(21) Appl. No.: 09/776,313

(22) Filed: Feb. 2, 2001

(65) Prior Publication Data

US 2002/0105663 A1 Aug. 8, 2002

(51) Int. Cl.[7] .............................................. G06F 15/00
(52) U.S. Cl. ....................... 358/1.9; 358/498
(58) Field of Search ................. 358/1.1, 1.2, 1.5, 358/1.9, 1.11, 1.12, 1.15, 1.18, 498; 400/578; 399/81

(56) References Cited

U.S. PATENT DOCUMENTS

| | | | |
|---|---|---|---|
| 5,061,958 A * | 10/1991 | Bunker et al. ............... 399/81 |
| 5,102,112 A * | 4/1992 | Takahashi ................... 271/9.08 |
| 5,375,199 A | 12/1994 | Harrow et al. ............... 715/771 |
| 5,644,334 A | 7/1997 | Jones et al. .................. 345/419 |
| 5,694,150 A | 12/1997 | Sigona et al. ................ 715/856 |
| 5,886,697 A | 3/1999 | Naughton et al. ........... 345/473 |
| 5,905,493 A | 5/1999 | Belzer et al. ................ 715/835 |
| 6,010,261 A * | 1/2000 | Maekawa .................... 400/605 |
| 6,447,184 B2 * | 9/2002 | Kimura et al. .............. 400/578 |

* cited by examiner

Primary Examiner—Gabriel Garcia
(74) Attorney, Agent, or Firm—David A. Norais

(57) ABSTRACT

A touch-screen interface of an operator control panel is provided on an imaging assembly, such as a printing assembly, and communicates the state of the printing assembly and its primary components to an operator, even when the operator is standing beyond a normal reading distance from the printing assembly. The touch-screen interface provides for a graphical representation in the form of icons or displays that show those components that are of interest to the operator during printing. This would include but is not limited to paper supply and paper take-up magazines, the center portion or printing area of the printer, and the current paper or media path. The icons or displays are laid out spatially on the operator control panel in an overhead view to match the layout of the printing assembly. Further, each of the displays or icons are sized large enough to be easily viewed and understood from well beyond a normal reading distance.

13 Claims, 7 Drawing Sheets

PRINTING ASSEMBLY AND AN OPERATOR CONTROL PANEL USER INTERFACE FOR THE PRINTING ASSEMBLY

FIELD OF THE INVENTION

The present invention relates to an imaging assembly, such as a printing assembly, and an operator control panel for the printing assembly. The operator control panel is designed to facilitate communications to the operator concerning the state of the printing assembly and its primary components, especially when the operator is standing beyond a normal reading distance from the printing assembly.

BACKGROUND OF THE INVENTION

In a photofinishing environment such as in a wholesale photofinishing lab, a printer operator is kept busy by operating several commercial printers, scanners and other large pieces of photofinishing equipment that are spread over a broad area with subdued lighting. They also perform tasks that can take them away from their equipment. This makes it a challenge for the operator to keep track of the state of each printer, and more specifically, multiple paper supply and take-up magazines that they are responsible for reloading. The printer's operator control panel provides a central location for the communication of the state of the printer and its paper magazines. However, the operator's work load and work environment require that the operator control panel provide the information so that the operator can quickly and easily determine the state of the printer and its paper magazines at a glance from well beyond a normal reading distance. However, the layout and design of conventional operator control panels make it difficult for an operator to determine the state of a printer when he/she is standing beyond a normal reading distance from the printer.

FIG. 1 schematically illustrates an example of a known operator control panel 21 for an Agfa Dimax Optical Printer. Reference numeral 20 in FIG. 1 represents a paper supply information section. Within paper supply information section 20, the length of paper removed from an active paper supply magazine is shown in box 22 in standard size text. Further, a pair of small overlapping circles 24 represent two magazines, with a solid circle denoting which one is active. Additionally, a vertical progress bar 26 indicates the percentage of paper in the magazine. In operator control panel 21, a paper take-up information section 28 is also shown. Like paper supply information section 20, paper take-up information section 28 includes a box 30 which shows the length of paper on an active paper take-up magazine in standard size text. Paper take-up information section 28 further includes a pair of small overlapping circles 31 that represent two magazines, in which a solid circle denotes which one is active. Further, a vertical progress active bar 32 indicates the percentage of paper in the magazine. Operator control panel 21 further includes a section 34a which provides function mappings to numeric keys on a keyboard and information regarding the film reel and their products in large size text; a section 34b which provides printer status information in standard text; a section 34c which is a messaging area and provides information as to the status of major components in standard size text; a section 34d which represents a command line interface; and a section 34e which provides function mappings to function keys on a keyboard.

A disadvantage of operator control panel 21 is that it provides no indication of whether standby supply and take-up paper magazines are useable to the printer for the current defined product, and further does not provide information as to how much paper the stand-by magazines contain. Therefore, in using operator control panel 21, an operator would have to walk up to the printer to determine whether the magazines need to be changed. Also, operator control panel 21 provides no graphical indication as to a state of paper threading and does not provide for a touch-screen operation. Operator control panel 21 further does not show graphically that images are left in the paper track.

FIG. 2 schematically illustrates a known operator control panel 40 for a Gretag Syntra optical printer. Panel 42 is generally a Microsoft Windows desktop while clock 43 is provided with MS Windows. As illustrated in FIG. 2, operator control panel 40 comprises a section 42 that is a user interface. Section 42 includes paper threading information, paper supply information and paper take-up information. In operator control panel 40, an active paper take-up position is represented by a circle 44 located in a lower-left corner of a box 46 that represents a printer. If circle 44 appears in a further box 48, which is gray in the operator control panel of FIG. 2, a paper magazine exists in an active position. The amount of paper in the active magazine is indicated by a pie chart 50 within circle 44. The percentage filled would be provided in standard text, for example "30%" as shown in FIG. 2, above circle 44. A box-like strip 52 to the left of box 48 and outside of box 46 indicates the presence of a paper magazine in a stand-by position. Operator control panel 40 also includes paper supply information. That is, as shown in FIG. 2, an active paper supply position is represented by a circle 56 located in a lower-right corner of box 46 representing the printer. If the circle appears in a further box 58 such as a gray box, a paper magazine exists in an active position. The amount of paper in the active magazine would be indicated by a pie chart 60 within circle 56. The percentage filled would be provided by standard text such as, for example "70%", as shown in FIG. 2. A box-like strip 62 to the right of active magazine 58 and outside of printer box 46 would indicate the presence of a paper magazine in a stand-by position.

Optical control panel 40 also provides paper threading information in the form of a solid line 64 that connects an active paper supply magazine and a take-up magazine. Solid line 64 as shown in FIG. 2 indicates a full threading, while a partial line would indicate a partial threading. On the other hand, no line indicates that there is no threading. Operator control panel 40 further includes sections 70a, 70b, 70c. Section 70a includes printer control buttons, section 70b includes statistics of a current batch represented in standard size text, and section 70c would include the status of the major components in standard size text. It is noted that a batch is a collection of photofinishing orders that have common attributes, such as a specific type of print.

A disadvantage of operator control panel 40 illustrated in FIG. 2 is that it provides no indication of whether a stand-by supply magazine and a take-up paper magazine are usable to the printer for the current defined product and how much paper they contain. Further, operator control panel 40 provides no indication of whether a paper magazine exists in a completed position for either paper supply or take-up. Also, line 64 that denotes paper threading is thin, making it difficult to see when viewing the screen from beyond a reading distance. Operator control panel 40 further does not graphically show via line 64 that images are left in the paper track. Further disadvantages of operator control panel 40 are that it does not provide a graphical representation of a completed magazine, does not provide an indication of what is in a stand-by magazine, does not provide an indication of what type of paper is in the standby magazine, and does not provide an indication of how much paper is in the stand-by magazine. Therefore, operator control panel 40 as illustrated in FIG. 2 does not provide all of the relevant information to the operator in a manner which makes it easy for the operator to read and comprehend.

A Kodak CLAS printer having an operator control panel is also known. A drawback with the operational control panel of the Kodak CLAS printer is that it uses basically standard size text to illustrate many of the functions of the printer. Further, the operational control panel of the Kodak CLAS printer does not use graphical representations of items such as active paper supply magazines and take-up magazines as well as paper threading.

SUMMARY OF THE INVENTION

The present invention provides for an improved operational control panel for an imaging assembly such as a high speed digital printer or printing assembly in a wholesale photofinishing lab. The operational control panel of the present invention comprises a touch-screen user interface that provides a simplified graphical representation of the printing assembly, showing those components that are of interest to an operator during printing in a highly visible manner. This includes the paper supply and paper take-up magazines, the center portion of the printing assembly, and the current paper path. The components of the operator control panel of the present invention are laid out spatially in an overhead view to match their layout in the printing assembly. Each of the components or sections of the operational control panel touch-screen is sized large enough to be easily viewed and understood from well beyond a normal reading distance, and a simple and intuitive color coding scheme is used to communicate the state of each paper magazine as it relates to the operator's task.

The operator control panel touch-screen interface of the present invention permits the operator to quickly and easily determine the state of each paper magazine and therefore, the overall state of printing when viewing the operational control panel from well beyond a normal reading distance. The color states and the graphical representations of the paper path also allow operators to determine whether printed paper exists in the paper path. All of this allows the operator to predict and prioritize their tasks since it will tell them which magazines will empty or fill first and which printers will require their attention first.

The present invention therefore relates to an operator control panel for a printing assembly which comprises a touch-screen interface that includes a media supply section, a printer center section and a media take-up section. The media supply section of the touch-screen interface comprises a plurality of supply magazine graphical displays that represent supply magazines of the printing assembly. The media take-up section of the touch-screen interface comprises a plurality of take-up magazine graphical displays that represent take-up magazines of the printing assembly. The printer center section of the touch-screen interface comprises at least one paper path graphical display. The at least one paper path graphical display represents a state of media threading in a printing area of the printing assembly between an active supply magazine of the supply magazines and an active take-up magazine of the take-up magazines. Each of the supply magazine graphical displays, the at least one paper path graphical display and the take-up magazine graphical displays are spatially displaced on the touch-screen interface in an overhead view in a manner that simulates a location of the supply magazines, the printing area and the take-up magazines of the printing assembly.

The present invention further relates to a printing assembly that comprises a plurality of media supply magazines; a printing area that is adapted to receive media for printing thereon from each of the media supply magazines; a plurality of take-up magazines which are each adapted to receive media from the printing area; and an operator control panel having a touch-screen interface. The touch-screen interface of the operator control panel comprises a plurality of first icons that correspond to the plurality of media supply magazines, a plurality of second icons that correspond to the plurality of take-up magazines, and a center section positioned between the first icons and the second icons that corresponds to the printing area. Each of the first icons, the second icons and the center section are graphically displayed on the touch-screen interface in a manner that spatially simulates a location of the media supply magazines, the take-up magazines and the printing area of the printing assembly.

The present invention further relates to an operator control panel for a printing assembly that comprises a touch-screen interface having at least one icon which represents a media component of the printing assembly and a paper path section which graphically represents a paper path in a printing area of the printing assembly.

The present invention further relates to a printing assembly that comprises at least one media magazine; a printing area operationally associated with the at least one magazine; and an operator control panel having a touch-screen interface. The touch-screen interface comprises at least one icon which represents the at least one media magazine, and a paper path section which graphically represents a paper path in the printing area.

DETAILED DESCRIPTION OF THE INVENTION

Figure 1:
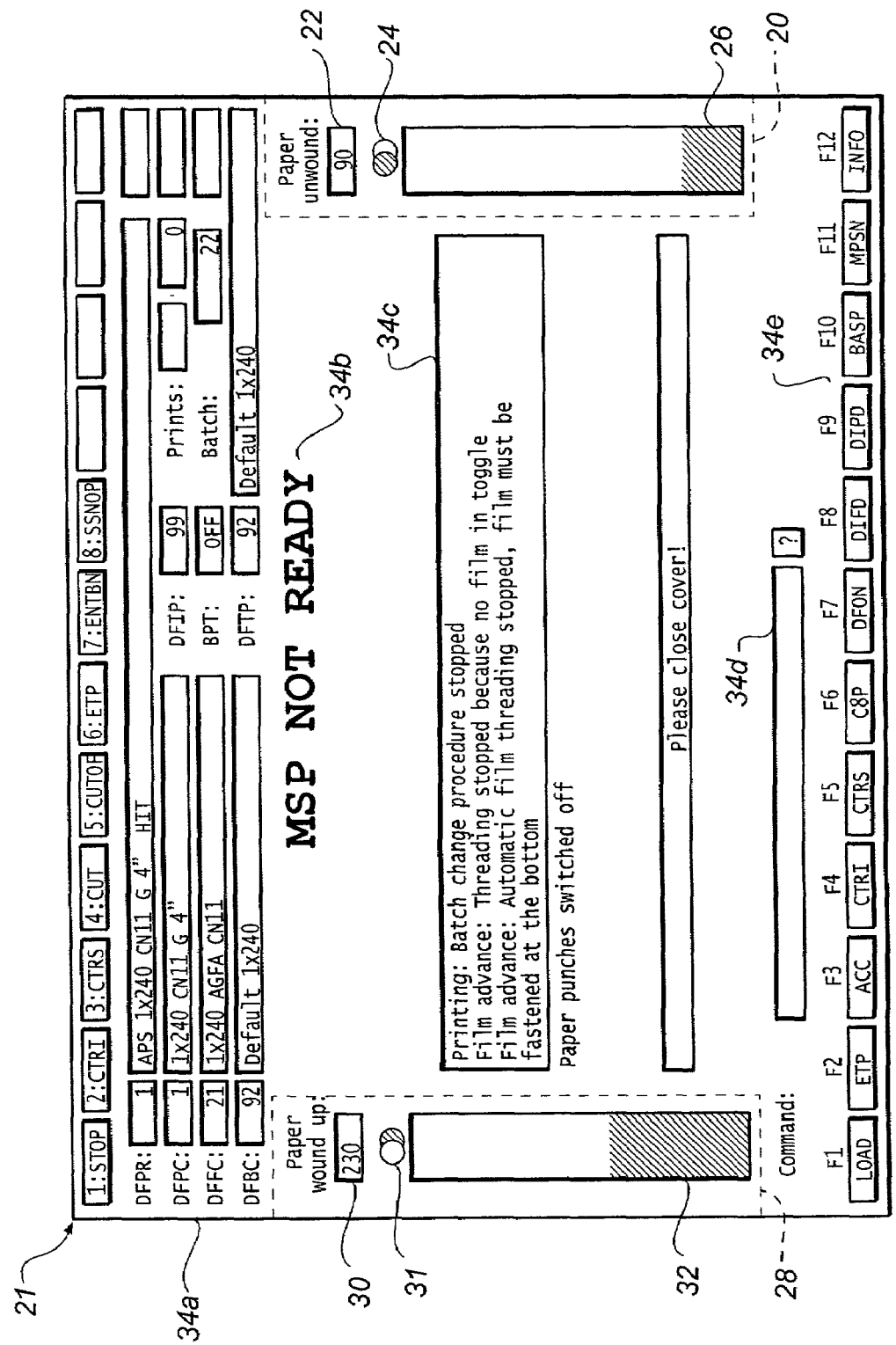
FIG. 1 is a schematic illustration of a conventional operator control panel for a printer.
Figure 2:
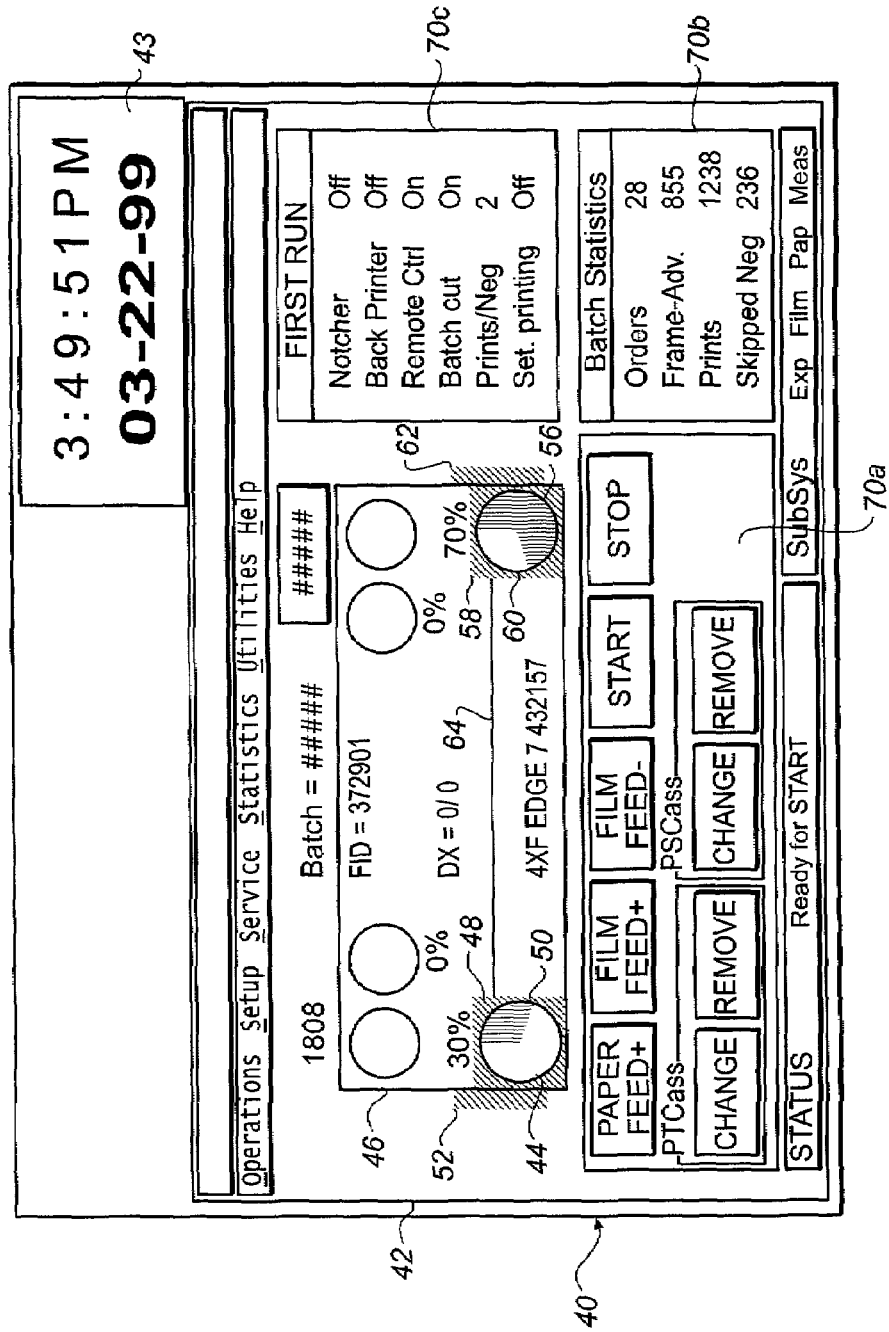
FIG. 2 is a schematic illustration of another type of conventional operator control panel for a printer.
Figure 3:
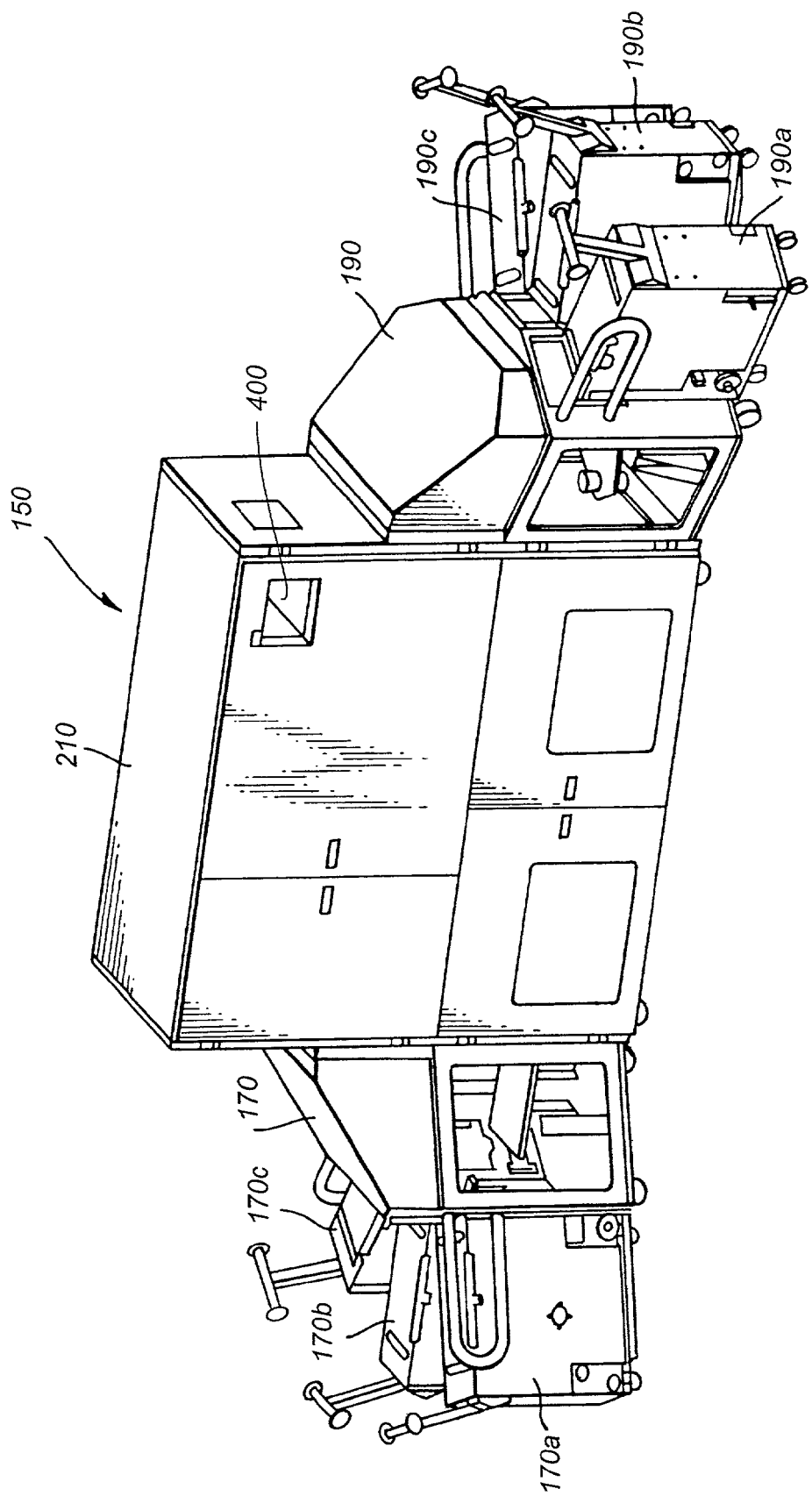
FIG. 3 illustrates a printing assembly which can be utilized with an operational control panel in accordance with the present invention.

Referring now to the drawings, wherein like reference numerals represent identical or corresponding parts throughout the several views, FIG. 3 is an overall view of an imaging assembly such as a printing assembly 150 having an operational control panel 400 in accordance with the present invention. As illustrated in FIG. 3, printing assembly 150 comprises a plurality of components. More specifically, printing assembly 150 comprises a media supply section 170 and a media take-up section 190. Media supply section 170 is adapted to accommodate supply components such as a plurality of media supply cassettes or magazines 170a, 170b, 170c, while media take-up section 190 is adapted to accommodate take-up components such as a plurality of media take-up cassettes or magazines 190a, 190b, 190c. As an option and as illustrated in FIG. 3, supply magazines 170a–170c and take-up magazines 190a–190c can be wheeled magazines which facilitate the interaction between the magazines and the corresponding supply sections and take-up sections (170, 190). However, the invention is not limited thereto, and the magazines do not have to be wheeled magazines.

Supply magazines 170a–170c can contain photosensitive media that is to be processed through a printing section 210. Take-up magazines 190a, 190b, 190c can initially be empty and each can be adapted to receive the photosensitive media after it has passed through printing section 210. During use of a printer assembly as illustrated in FIG. 3, an active paper supply magazine is considered a magazine having photosensitive media for printing thereon. When an active paper supply magazine is completed, the printing assembly 150 is adapted to receive photosensitive media from a standby paper supply magazine. Reference is made to U.S. patent application Ser. No. 09/418,230 for a description of the operation of a printing assembly as illustrated in FIG. 3. Further, it is noted that printing assembly 150 has been shown to illustrate a device in which a plurality of cassettes or magazines are utilized on a take-up side and a supply side. It is noted that the present invention is not limited to the arrangement illustrated in FIG. 3, and that the operator control panel of the present invention is applicable to numerous types of printing and/or imaging devices in which there is at least one supply magazine on an input side and at least one take-up magazine on an output side.

More specifically, printing assembly 150 as illustrated in FIG. 3 in general has multiple positions for paper supply magazines and multiple positions for take-up magazines that are located on the left and right side of the printer assembly, respectively. In the embodiment illustrated in FIG. 3, there is shown 3 positions for paper supply magazines and 3 positions for paper take-up magazines. However, the present invention is not limited thereto and it is noted that the number of take-up and supply magazines is based on design considerations.

Figure 4:
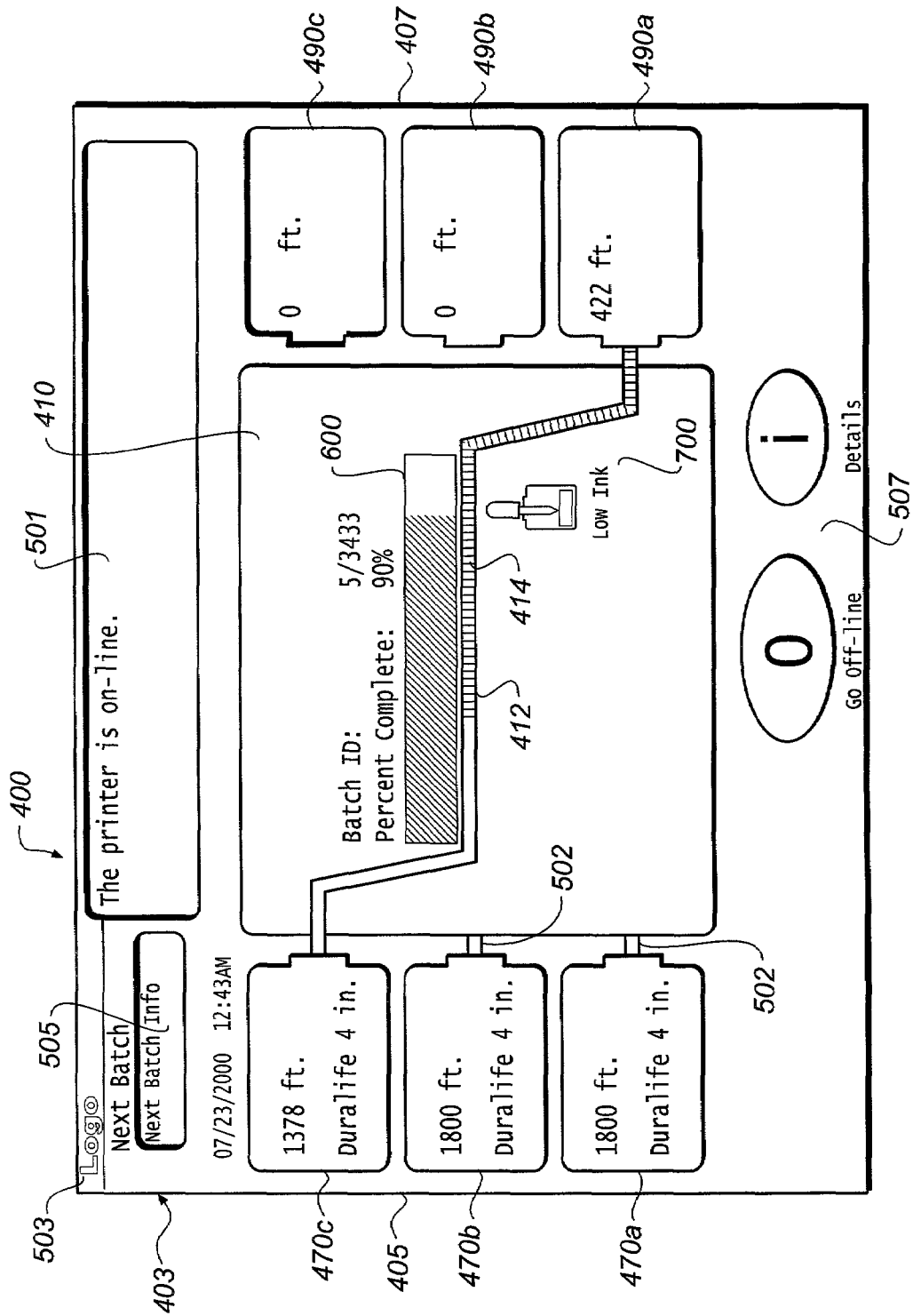
FIG. 4 is a schematic illustration of the operational control panel in accordance with the present invention.

With reference to FIG. 4, control panel 400 in accordance with the present invention is schematically illustrated. Operator control panel 400 is designed so as to spatially and graphically represent supply magazines 170a, 170b, 170c and take-up magazines 190a, 190b, 190c (FIG. 3), and can use predetermined color schemes to indicate the state of each magazine. For example, and specifically referring to FIG. 4, operator control panel 400 comprises a touch-screen interface 403 that includes a media supply section 405. Media supply section 405 comprises a plurality of supply magazine graphical displays or icons 470a, 470b, 470c. In the embodiment of FIG. 4 and with reference to FIG. 3, supply magazine graphical display or icon 470a represents or corresponds to supply magazine 170a; supply magazine graphical display or icon 470b represents or corresponds to supply magazine 170b; and supply magazine graphical display or icon 470c represents or corresponds to supply magazine 170c.

Touch-screen interface 403 further includes a media take-up section 407 that comprises a plurality of take-up magazine graphical displays or icons 490a, 490b, 490c. Referring to FIG. 3 and with reference FIG. 4, take-up magazine graphical display or icon 490a represents or corresponds to take-up magazine 190a; take-up magazine graphical display or icon 490b represents or corresponds to take-up magazine 190b; and take-up magazine graphical display or icon 490c represents or corresponds to take-up magazine 190c.

Touch-screen interface 403 further includes a printer center section or printing area 410 which represents or corresponds to printing section 210 of printing assembly 150. Touch-screen interface 403 also includes a message/instruction area 501, a logo area 503, a next batch information area 505 and a navigation bar 507.

An advantage of operator control panel 400 is that only the components of printing assembly 150 that are of importance to the operator are displayed. This includes paper supply magazine graphical displays or icons 470a–470c, paper take-up magazine graphical displays or icons 490a–490c, and printer center section 410.

Printer center section 410 includes a graphical display 412 which simulates or represents a path of paper from an active supply magazine to an active take-up magazine. In the example of FIG. 4, paper path 412 extends between paper supply magazine graphical display 470c and paper take-up magazine graphical display 490a to illustrate that supply magazine 170c and take-up magazine 190a are active, and that the paper path goes from supply magazine 170c to take-up magazine 190a.

In a further feature of operational control panel 400, it is noted that the graphical displays and center section take up most of touch-screen interface 403. More specifically, supply magazine graphical displays or icons 470a–470c; paper path 412; and take-up magazine graphical displays or icons 490a–490c are large enough to be seen from beyond a normal reading distance. As an example, operational control panel 400 could be a flat panel touch-screen which is in the range of 8 to 21 inches and preferably about 12.1 inches.

A further feature of operational control panel 400 is that displays or icons 470a–470c and 490a–490c are graphically displayed as noted above, as opposed to textually. Further, display or icons 470a–470c and 490a–490c spatially represent or simulate the location of the corresponding supply magazines 170a–170c and the corresponding take-up magazines 190a–190c with respect to printing assembly 150 as seen from an overhead view.

In a further feature of the invention, touch-screen interface 403 can be a windows-based system in which supply magazine graphical displays 470a–470c and take-up magazine graphical displays 490a–490c act as buttons (touch targets) to access functionally for that magazine. For example, an operator who wishes to activate or access a function for magazine 170a would touch graphical display or icon 470a. Further, center section 410 can include functional touch targets for cutting, releasing, etc., as well as informational symbols such as for example, a low-ink icon 700.

With operational control panel 400, it is also possible to provide for a simple and intuitive predetermined color scheme or code to indicate or represent an operating state of each paper magazine as it relates to an operator's task. As an example, the color green can be used on one of the displays 470a–470c to indicate which one of supply magazines 170a–170c is usable by the printing assembly and which will not require reloading in the next few minutes. The color yellow can be used on one of the displays 470a–470c to indicate which one of the magazines is usable by the printer, but will require reloading in the next few minutes. The color red can be used to indicate that the magazine is not usable by the printer and is in the process of being released by the printer. A light gray background can be used to indicate that a new magazine has been loaded and is in the process of being defined by the printer. Further, a blank magazine position (a concave shaped or recessed portion in the section where a display or icon should be) indicates that there is no magazine present in that position.

In a further feature of the present invention, a paper leader 502 (see, for example, graphical displays 470a, 470b in FIG. 4) can be graphically displayed to indicate that a magazine, regardless of the state, contains some length of paper.

Center section 410 can also display a progress bar 600 to illustrate the progress of a present batch. The relationship between a batch and a roll of paper in a supply or take-up magazine is variable, i.e., the prints from one batch may take less than one full roll of paper or may be spread across several sequential rolls of paper. Therefore, the relationship between the progress bar and the current paper supply and take-up magazine is also variable. Additionally, center section 410 can provide information with regard to the color-coded magazines which are being used, and can be used as a work area to define paper in a newly inserted supply magazine or a core width of a newly inserted take-up magazine. A wrap around effect can also be used to convey to the user which magazine is being defined.

In the example of FIG. 4, it can be seen that the active paper supply magazine is paper supply magazine 170c represented by graphical display 470c, and that magazine 170c includes 1378 ft. of Kodak DuraLife 4 inch paper. The paper path goes from paper supply magazine 170c to paper take-up magazine 190a which is represented by graphical display 490a, and there is 422 ft. of paper in magazine 190a. In the example of FIG. 4, progress bar 600 indicates that 90% of the specific batch has been completed, while the rest of printer center section 410 can be used to show graphical or textual information such as low ink 700, printer warning icon, etc.

In a still further feature of operator control panel 400, paper path 412 can be utilized to determine that a paper supply magazine has been successfully threaded and cinched to a paper take-up magazine. More specifically, paper path 412 will change visually as it is being threaded. A line extending from a supply, but not to a take-up indicates a partial threading state. Once completely threaded the line will be complete between one supply and one take-up magazine. Paper path 412 also changes state to indicate the presence of prints (exposed/printed paper) within the paper path. If prints are present the path will contain parallel lines 414. A path containing parallel lines 414 will indicate the presence of images within the paper path.

In a still further feature of operator control panel 400, when a new paper supply magazine is mounted to printing assembly 150, a dialog window can appear on center section 410. This permits an operator to specify the type of paper in the new magazine. The dialog window can remain open until the operator has specified the paper type. In the case that the operator walks away from the printer without specifying the paper type, the dialog window and its associated paper magazine can be designed to be easily distinguished when being viewed from beyond a normal reading distance. Also, all other paper magazines can be viewable when the paper magazine definition dialog window is displayed. The dialog window which would be opened in center section 410 of touch-screen interface 403 can include information such as the type of paper, the width of paper, the surface of the paper and the emulsion. The dialog window can also include informational icons such as up and down arrows, and buttons such as cut, release, rewind, cancel, etc.

In a still further feature of operator control panel 400, when a new paper take-up magazine is mounted to printing assembly 150, a dialog window can appear on center section 410 which permits an operator to specify core width in the new magazine. The dialog window can remain open until the operator has specified the paper type. In the case that the operator walks away from the printer without specifying the core width, the dialog window and its associated paper magazine can be designed to be easily distinguished when being viewed from beyond a normal reading distance. Also, all other paper magazines can be viewable when the core width definition dialog window is displayed.

With the specific embodiment as illustrated in FIG. 4, the components discussed above take up practically the whole screen and thus, it is possible to view the components or elements of operational control panel 400 from a distance to determine the status of all magazines and the overall printer status. It also makes it easier for an operator to determine the next course of action when the operator is monitoring several printers. Further, action can be taken on individual magazines by touching the graphics on the screen. This will open a window specific to the functions available for that magazine.

Figure 5:
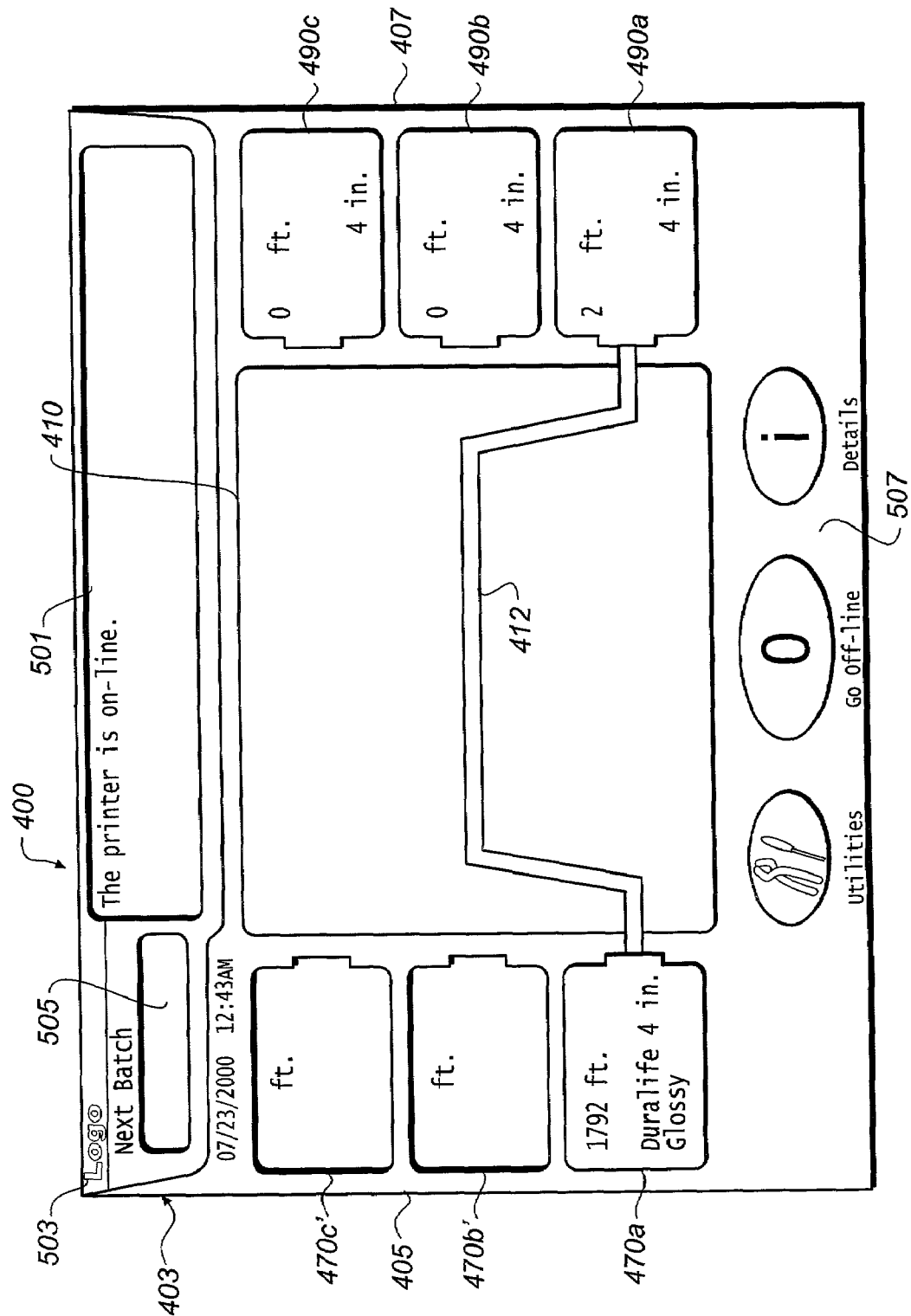
FIGS. 5–7 schematically illustrate examples of screen information which can be displayed using the operator control panel of the present invention.
Figure 6:
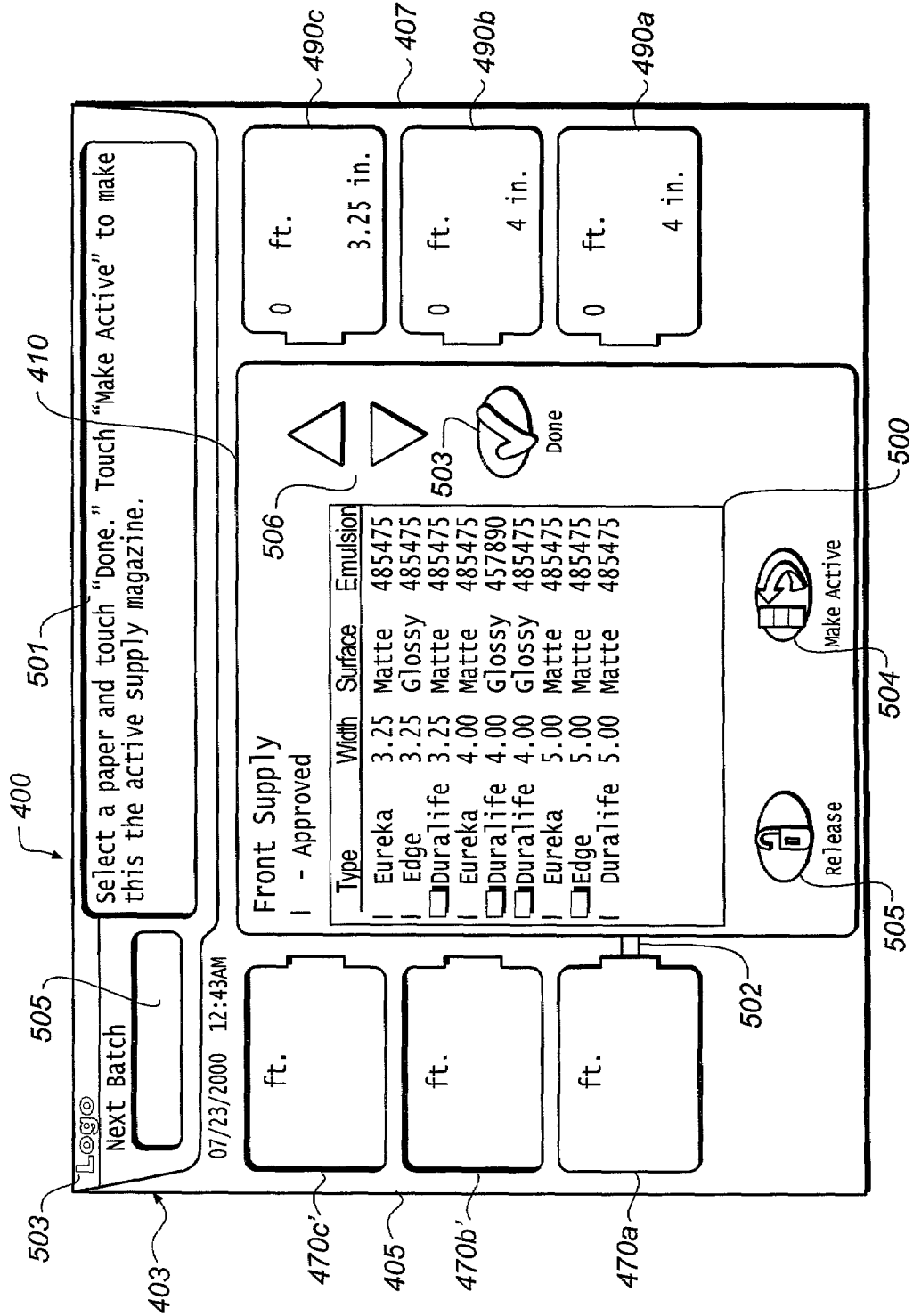
Figure 7:
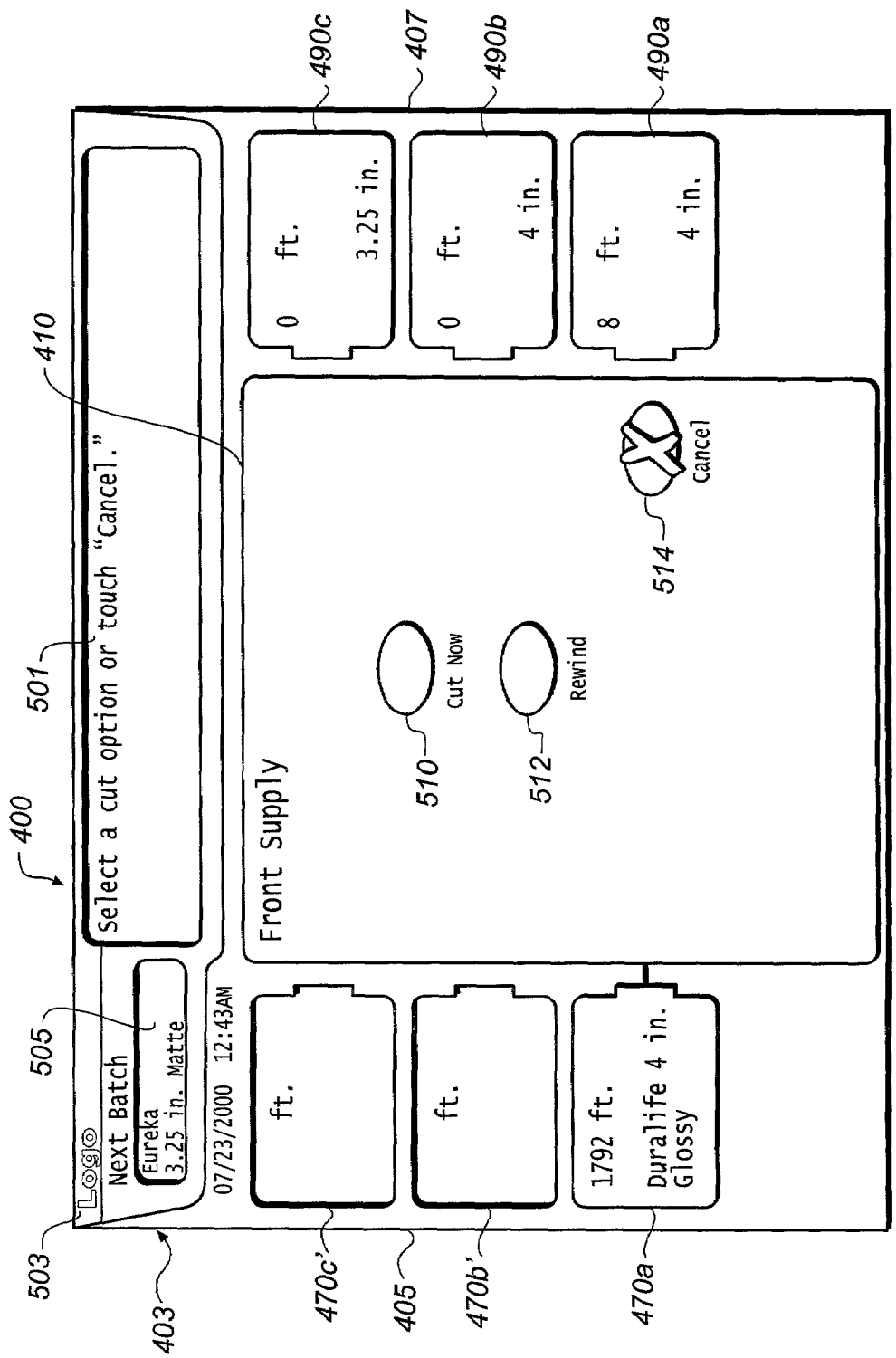

FIGS. 5–7 illustrate examples of status information, graphical displays and/or icons that can be displayed utilizing operator control panel 400 of the present invention. In the example of FIG. 5, it is noted that graphical display or icon 470a is shown so as to represent that supply magazine 170a (FIG. 3) is an active magazine. It is further shown that graphical displays or icons 490a, 490b and 490c are illustrated so as to represent that each of take-up magazines 190a, 190b and 190c are present on printing assembly 150. In the example of FIG. 5, it is also shown that paper path 412 has been established between supply magazine 170a (active) and take-up magazine 490a (active). It is further represented by graphical display 470a that supply magazine 170a includes 1792 ft. of Kodak DuraLife 4 in. glossy paper; while graphical display 490a represents that 2 ft. of paper has entered into take-up magazine 190a. Also, center section 410 provides a graphical indication by way of paper path 412 that paper has been successfully threaded and cinched to take-up magazine 190a since lines 414, as shown in FIG. 4, do not appear.

As a further option, an indication that there are no paper magazines present can be graphically represented by having sections which simulate recessed or concave portions present at locations 470b', 470c' where the icons should be located. In the example of FIG. 5, recessed portions at locations where icons 470b and 470c should appear indicate that magazines 170b and 170c are not present. As also illustrated in the example of FIG. 5, standby take-up magazines are represented by graphical icons 490b and 490c. Further, informational area 501 can include an informational message such as the "printer is off line" which is represented in the example of FIG. 5.

In the example of FIG. 6, a dialog window 500 is displayed in center section 410. More specifically, when a new paper supply magazine is mounted to the printing assembly as represented by graphical display or icon 470a, dialog window 500 appears on center section 410 of operator control panel 400. Dialog window 500 permits the operator to specify the type of paper in the new magazine and remains open until the operator has specified the paper type. In case the operator walks away from the printing assembly without specifying the paper type, dialog window 500 and its associated paper magazine can be designed to be easily distinguished from beyond a normal reading distance. Also, all other paper magazines can be viewable when dialog window 500 is displayed. Center section 410 can also include instructional icons such as up and down arrows 506 for scrolling within dialog window 500, a "done" button 503, a "make active" button 504 and a "release" button 505.

As in FIG. 5, operator control panel 400 further permits an operator to specify specific instructions with respect to active supply magazines and take-up magazines. For example, in the example of FIG. 7, operator control panel 400 and specifically center section 410 can include touch button icons 510, 512 and 514 which initialize and facilitate operations such as cutting and/or releasing magazines and canceling a job when needed.

The present invention has been described in terms of having an operator control panel on a printing assembly having magazines. However, the present invention is not limited thereto. As a further option, the operator control panel can be used on other imaging devices such as, for example, a film scanner having supply reels and take-up reels. The invention is also applicable to other types of media such as film.

As an added feature, the operator control panel can be pivotally, rotatably and/or movably mounted to the printing or imaging assembly to permit easy viewing from various angles.

The invention has been described in detail with particular reference to certain preferred embodiments thereof, but it will be understood that variations and modifications can be effected within the spirit and scope of the invention.

What is claimed is:

1. An operator control panel for a printing assembly, the operator control panel comprising:
   a touch-screen interface which comprises a media supply section, a printer center section and a media take-up section;
   wherein:
   said media supply section comprises a plurality of supply magazine graphical displays which represent supply magazines of the printing assembly;
   said media take-up section comprises a plurality of take-up magazine graphical displays which represent take-up magazines of the printing assembly;
   said printer center section comprises at least one paper path graphical display, said at least one paper path graphical display represents a state of media threading in a printing area of said printing assembly between an active supply magazine of said supply magazines and an active take-up magazine of said take-up magazines; and
   each of said supply magazine graphical displays, said at least one paper path graphical display and said take-up magazine graphical displays are spatially displayed on said touch-screen interface in an overhead view in a manner which simulates a location of the supply magazines, the printing area and the take-up magazines of the printing assembly.

2. An operator control panel according to claim 1, wherein an operating state of said supply magazines of the printing assembly is represented by predetermined colors on the supply magazine graphical displays.

3. An operator control panel according to claim 1, wherein an operating state of the take-up magazines of the printing assembly is represented by predetermined colors on the take-up magazine graphical displays.

4. An operator control panel according to claim 1, wherein each of said supply magazine graphical displays and each of said take-up magazine graphical displays, when touched by an operator, are adapted to access functionality for a corresponding supply magazine of said supply magazines, or a corresponding take-up magazine of said take-up magazines.

5. A printing assembly comprising:
   a plurality of media supply magazines;
   a printing area which is adapted to receive media for printing thereon from each of the media supply magazines;
   a plurality of take-up magazines which are each adapted to receive media from the printing area; and
   an operator control panel having a touch-screen interface, said touch-screen interface comprising a plurality of first icons which correspond to said plurality of media supply magazines, a plurality of second icons which correspond to said plurality of take-up magazines, and a center section positioned between said first icons and said second icons which corresponds to said printing area, wherein each of said first icons, said second icons and said center section are graphically displayed on said touch-screen interface in a manner which spatially simulates a location of said media supply magazines, said take-up magazines and said printing area of said printing assembly.

6. A printing assembly according to claim 5, wherein said center section comprises a paper path graphical representation which illustrates a state of paper threading between an active supply magazine of said supply magazines and an active take-up magazine of said take-up magazines.

7. A printing assembly according to claim 5, wherein said center section comprises a paper path graphical representation which indicates which one of said supply magazines is an active supply magazine and which one of said take-up magazines is an active take-up magazine, said paper path graphical representation illustrating a path of media from said active supply magazine to said active take-up magazine.

8. A printing assembly according to claim 5, wherein said center section comprises a paper path graphical representation which indicates whether images are present or absent within a paper path in said printing area.

9. A printing assembly according to claim 5, wherein said center section comprises a progress bar which represents a progress of a job batch from an active supply magazine of said supply magazines to an active take-up magazine of said take-up magazines.

10. A printing assembly according to claim 5, wherein each of said first and second icons are touch-targets for accessing functionality for said supply magazine or said take-up magazine which corresponds to said first and second icons.

11. A printing assembly according to claim 5, wherein an operational state of each of said supply magazines and each of said take-up magazines is represented by a color coding scheme.

12. A printing assembly according to claim 5, wherein said first icons, said second icons and said center section represent a substantial portion of said touch-screen interface.

13. A printing assembly according to claim 5, wherein said first icons, said second icons and said center section are sized so as to permit them to be seen and understood by an operator from a distance which is beyond a normal reading distance.

* * * * *